United States Patent [19]

Adamus et al.

[11] 4,257,254
[45] Mar. 24, 1981

[54] ADAPTER CUSHION

[75] Inventors: Ronald A. Adamus, Cleveland; Arlan H. Heiser, Brecksville, both of Ohio

[73] Assignee: Teledyne Industries, Inc., Cleveland, Ohio

[21] Appl. No.: 21,228

[22] Filed: Mar. 16, 1979

[51] Int. Cl.³ .............................................. B21J 9/02
[52] U.S. Cl. ..................................................... 72/432
[58] Field of Search ................. 72/432, 431, 350, 351, 72/453.13, 453.06, 453.01, 453.18; 92/85 R

[56] References Cited

U.S. PATENT DOCUMENTS

| | | | |
|---|---|---|---|
| 1,029,462 | 6/1912 | Rife | 267/1 |
| 2,112,012 | 3/1938 | Byerlein | 72/453.13 |
| 3,215,426 | 11/1965 | Engels | 267/1 |
| 3,279,780 | 10/1966 | Williamson | 72/351 |
| 3,290,034 | 12/1966 | Williamson | 72/453.13 |
| 3,457,765 | 7/1969 | Heiser | 72/453.06 |
| 3,583,201 | 6/1971 | Popaz | 72/432 |
| 3,913,460 | 10/1975 | Wright | 92/85 R |

FOREIGN PATENT DOCUMENTS 890701  1/1972  Canada ...................................... 72/350

OTHER PUBLICATIONS

Publication: "Pressure From Parallels", by Teledyne, Efficient Industries, Hyson Division.
Publication: "New Universal Cushion and Ram Adapter", by Hyson Division of Efficient Industries Corp., Pub. 1973.

*Primary Examiner*—Francis S. Husar
*Assistant Examiner*—Gene P. Crosby
*Attorney, Agent, or Firm*—Yount & Tarolli

[57] ABSTRACT

An improved adapter cushion is used in a press with a die assembly having a plurality of projecting die pins. The adapter cushion includes a one-piece cylinder block in which a plurality of cylinder chambers are formed. Cylinder sleeves or liners are telescopically disposed in the cylinder chambers and are connected with the one-piece cylinder block by threaded connections. Replaceable tubular guide bushings are disposed in the end portions of the sleeves to guide relative movement between the die pins and the cylinder block. In order to provide a yieldable support for the die pins, pistons are urged toward axially outer ends of the sleeves under the influence of fluid pressure. During operation of a press, the die pins work against the fluid pressure acting on the pistons. In order to facilitate utilization of the adapter cushion with different types of dies, a cylinder sleeve can be readily removed and a cylinder plugged without disassembling the adapter cushion. Noise reducing resilient bumpers are advantageously mounted on the pistons.

28 Claims, 6 Drawing Figures

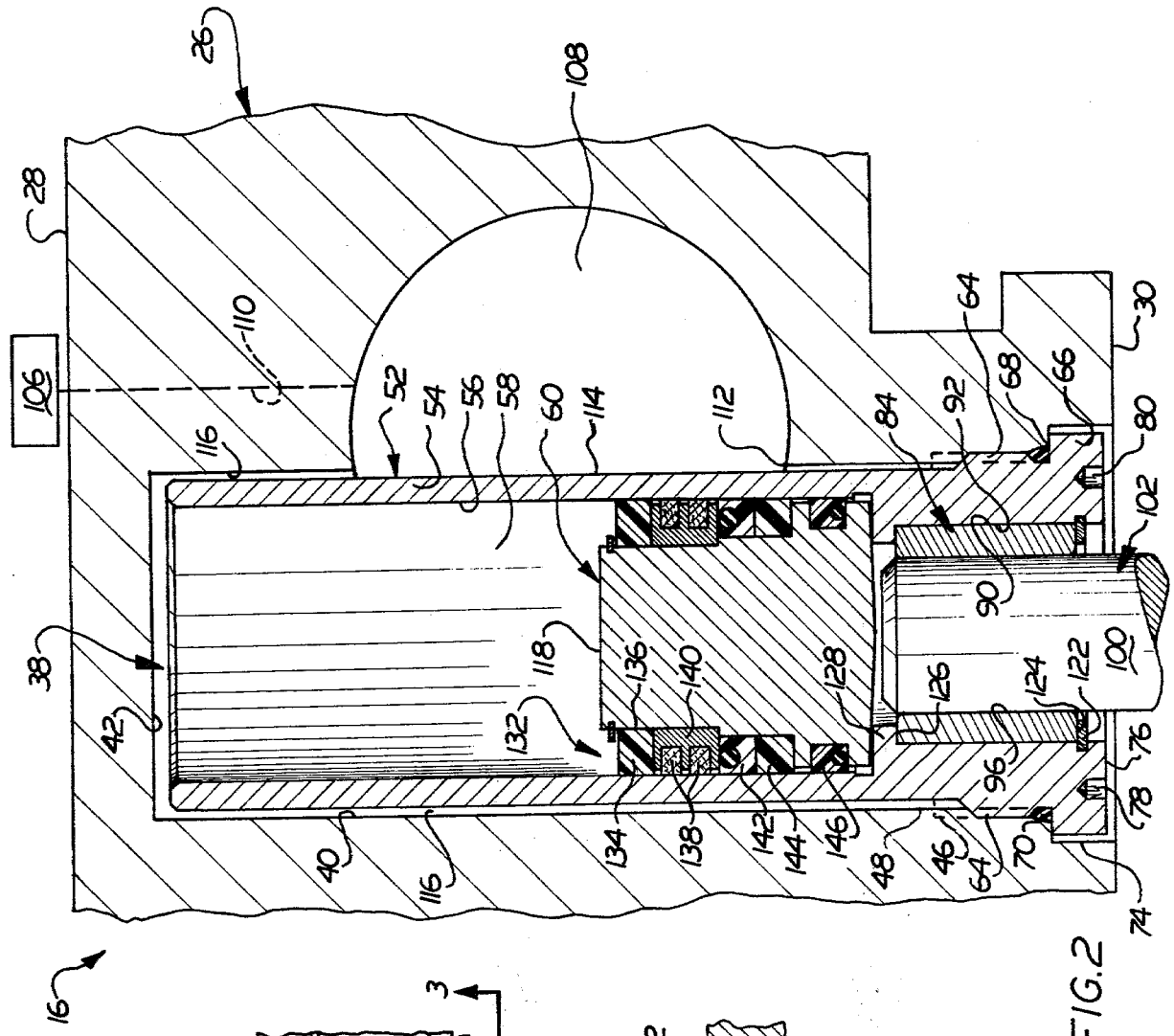
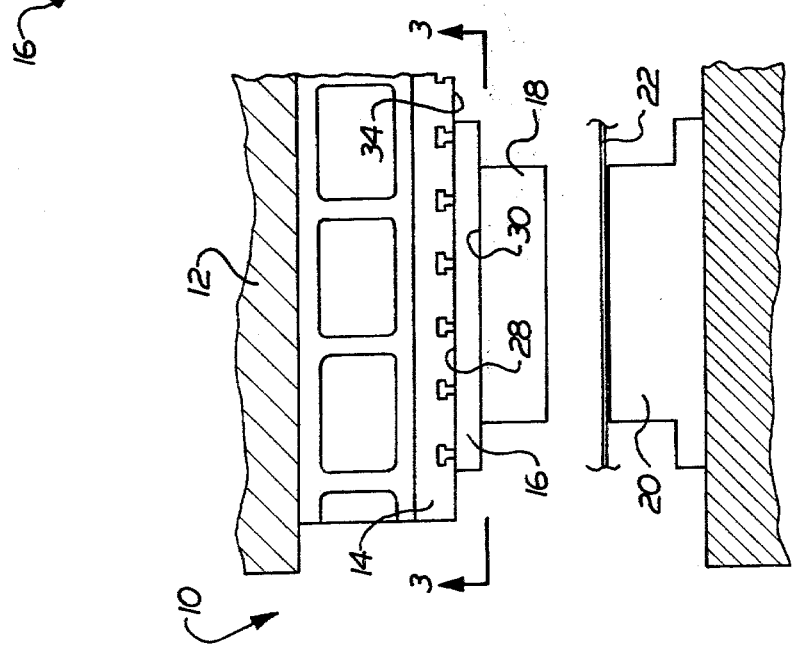
FIG.1
FIG.2

ADAPTER CUSHION

BACKGROUND OF THE INVENTION

This invention relates generally to an adapter cushion for use in a press or the like with a die assembly having a plurality of projecting pins.

Adapter cushions have previously been utilized in sheet metal forming presses to yieldably load various elements of a die. These known adapter cushions have previously included one or more plates which have cooperated with a cylinder block or spacer bar and with piston and cylinder units. The pistons are forced axially outward relative to the cylinders by fluid pressure in the cylinders to provide a yieldable loading for the push-pins of a die assembly. One of these known adapter cushions is disclosed in U.S. Pat. No. 3,457,765. Generally similar adapter cushions are commercially available.

Fluid leakage is a problem which can be encountered with a known adapter cushion which is formed by interconnecting one or more plates with a cylinder assembly or casting. If a plate is not accurately machined to have a flat smooth surface and if it is not engaged by a cooperating flat smooth surface, high pressure gas can leak through joints formed with the plate. In addition, even if the plate is originally formed with a very flat smooth surface, the plate can become nicked or slightly warped during extended usage in such a manner as to result in the leakage of gas. Of course, it is relatively expensive to form a large plate with a perfectly flat smooth surface which will provide a joint with a mating surface which will not leak when exposed to gas at a pressure of 1500 psi.

Many adapter cushions are constructed to be utilized with die assemblies having different pin arrangements. If one of these pin arrangements is such that a die pin is not associated with a particular cylinder, the flow of gas from the inactive cylinder can be blocked by either a piston and its associated seal or by plugging an opening through which gas flows to the cylinder. With certain known adapter cushions, the die pin enters the cylinder through one end and high pressure fluid enters the cylinder through the opposite end. The plugging of the fluid passage at one end of a cylinder requires a substantial amount of time since the passage is relatively inaccessible.

During operation of known adapter cushions, there is a substantial amount of noise. This is due to engagement of a die pin with the end face of a piston and engagement of the piston with the end of a cylinder. Although the noise may be acceptable in certain environments, in other environments the noise is objectionable.

Efforts have previously been made to retrofit adapter cushions to existing presses. Although adapter cushions have been retrofitted into many presses and have enhanced their operating characteristics, difficulties have been encountered in retrofitting adapter cushions into certain presses. In order to minimize these difficulties, the stroke and overall height of an adapter cushion should be minimized. Of course, the overall height of an adapter cushion tends to be increased by the presence of relatively thick end plates and/or relatively long pistons.

SUMMARY OF THE PRESENT INVENTION

The present invention relates to a new and improved adapter cushion having a one-piece cylinder block which eliminates the need for flat top and bottom plates and the associated joints between the plates and a cylinder assembly. The use of a one-piece cylinder block substantially reduces the cost of fabricating an adapter cushion. This is because it is easier to form cylinders in a one-piece block than it is to form flat top and bottom plates which are used in association with a casting in which cylinder sleeves are mounted. In addition, eliminating the top and bottom plates and forming the cylinder block as one-piece facilitates disassembly of the adapter cushion since there are fewer components which have to be removed.

Another feature of the present invention is the use in the one-piece cylinder block of cylinder sleeves in which guide bushings are releasably mounted. The bushings guide relative movement between the adapter cushion and die pins during operation of a press. By releasably mounting the guide bushings in the cylinder sleeves, the guide bushings can be readily replaced in the event of wear during extended periods of operation.

The cylinder sleeves are connected with the one-piece cylinder block by threaded connections. These threaded connections are readily accessible since they are located adjacent to a major side surface of the one-piece cylinder block. The threaded connections enable the cylinder sleeve to be readily removed from the block and plugs inserted in place of cylinder sleeves when the die pin configuration is changed. Since the cylinder sleeves and plugs are readily interchanged, press down time required to make a die change is reduced. In addition, by using plugs to close inactive cylinder block openings for a particular die pin configuration, the investment required in cylinder sleeves and pistons is minimized.

In accordance with still another feature of the present invention, the operating noise associated with an adapter cushion is minimized. This is accomplished by providing resilient bumpers to absorb the impact forces against the pistons. Although the bumpers could be mounted in many different ways, it is preferred to mount a resilient bumper in an opening formed in the piston. This opening is sized so as to enable the bumper to be compressed by the die pin as it moves into engagement with the end portion of the piston. The operating noise associated with the adapter cushion is still further reduced by the provision of a second resilient bumper to minimize noise caused by impacting of the end portion of a piston against the end of a cylinder.

The overall height of an adapter cushion constructed in accordance with the present invention is minimized in two different ways. The elimination of top and bottom plates by the use of a one-piece cylinder block tends to reduce the overall height of the adapter cushion. In addition, the pistons are formed with a relatively short axial extent to further reduce the overall height of the adapter cushion.

Accordingly, it is an object of this invention to provide a new and improved adapter cushion which is relatively easy to fabricate, durable and leak-free in operation and has a relatively small overall height.

Another object of this invention is to provide a new and improved press adapter cushion which tends to minimize the operating noise of a press.

Another object of this invention is to provide a new and improved press adapter cushion having a one-piece cylinder block.

Another object of this invention is to provide a new and improved press adapter cushion having easily removed cylinder sleeves in which releasable guide bushings are advantageously mounted.

BRIEF DESCRIPTION OF THE DRAWINGS

The foregoing and other objects and features of the present invention wil become more apparent upon a consideration of the following description taken in connection with the accompanying drawings wherein:

FIG. 1 is a schematic illustration of a known press having an adapter cushion constructed in accordance with the present invention;

FIG. 2 is an enlarged fragmentary sectional view of a portion of the adapter cushion and illustrating the manner in which a piston and sleeve are disposed in a cylinder chamber formed in a one-piece cylinder block;

DESCRIPTION OF SPECIFIC PREFERRED EMBODIMENTS OF THE INVENTION

Figure 3:
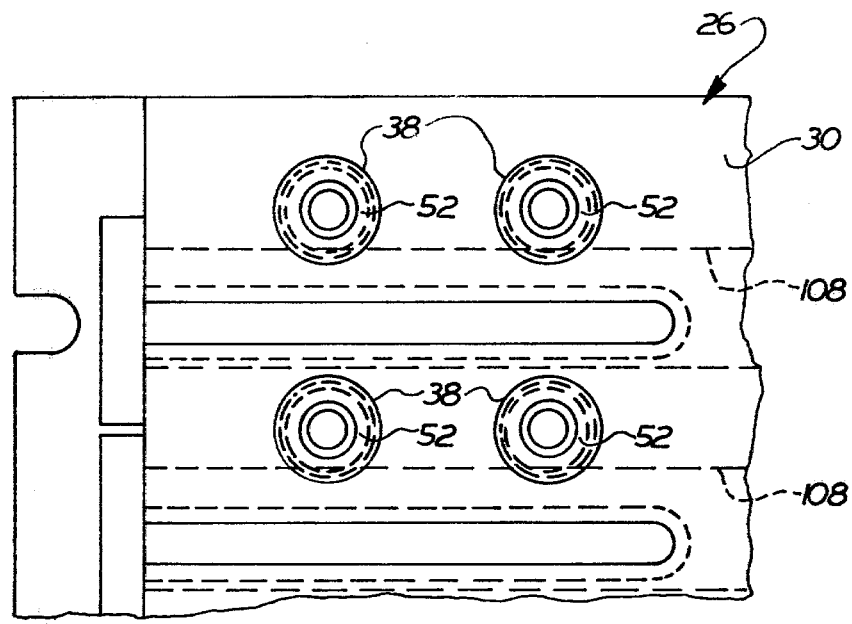
FIG. 3 is a fragmentary portion of a plan view taken generally along the line 3—3 of FIG. 1 and illustrating the manner in which cylinder chambers are located relative to each other and passages for conducting fluid pressure through the one-piece cylinder block.

A press assembly 10 constructed in accordance with the present invention is illustrated in FIG. 1. The press assembly 10 includes a ram 12 having an end face or piece 14 upon which an adapter cushion 16 constructed in accordance with the present invention is mounted. An upper die assembly 18 is connected with the adapter cushion 16 and cooperates with a lower die assembly 20 to form a piece of sheet metal 22 during operation of the press 10. The manner in which the upper die assembly 18 cooperates with the adapter cushion 16 and lower die assembly 20 during operation of a press is substantially the same as is described in U.S. Pat. No. 3,457,765 and will not be further described herein in order to avoid prolixity of description.

In accordance with a feature of the present invention, the adapter cushion 16 includes a one-piece metal cylinder block 26 (see FIG. 2). The one-piece cylinder block 26 has a pair of rectangular parallel major side surfaces 28 and 30 which are interconnected by four minor side surfaces which are disposed in a rectangular array. The upper major side surface 28 abuts a lower surface 34 (see FIG. 1) of the ram 12. The lower major side surface 30 of the adapter cushion 16 abuts the die assembly 18. The lower major side surface of the one-piece cylinder block 26 has a configuration which is the same as the configuration of the lower face 34 of the ram 12. This enables the upper die assembly 18 to be connected with the adapter cushion 16 in the same manner as in which was intended to be connected with the ram.

Figure 4:
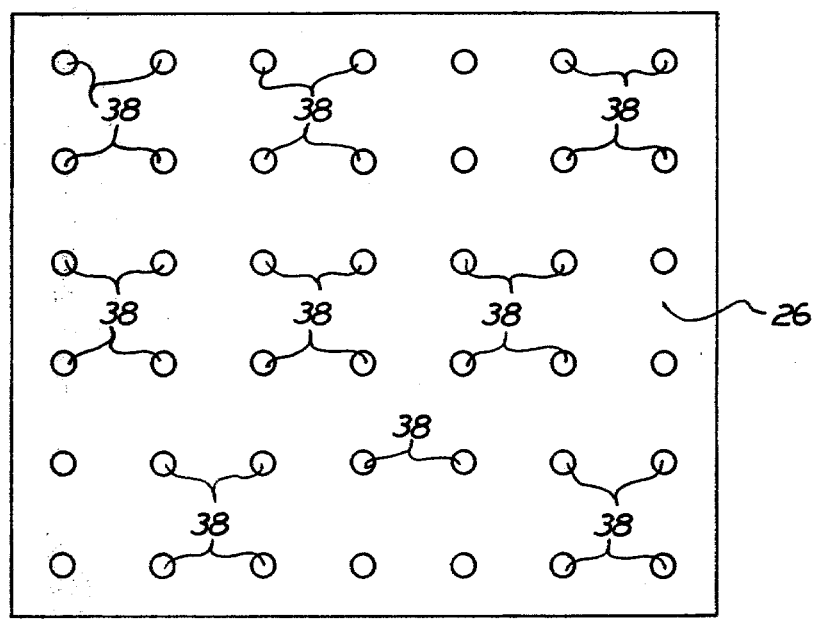
FIG. 4 is a schematic plan view illustrating the manner in whih cylinder chambers are disposed in a rectangular array in the one-piece cylinder block of FIGS. 2 and 3.

The one-piece cylinder block 26 is provided with a rectangular array of cylindrical cylinder chambers 38 (see FIGS. 2, 3 and 4). The cylinder chamber 38 is bored into the cylinder block 26 from the flat lower end face 30 (FIG. 2). The cylinder chamber 38 has a cylindrical sidewall 40 which extends axially inwardly from and is perpendicular to the lower end face 30. The sidewall 40 terminates at a circular end surface 42 which extends parallel to the upper and lower cylinder block surfaces 28 and 30.

In order to tend to minimize the overall height of the adapter cushion 16, the end surface 42 of the cylinder chamber 38 is relatively close to the upper end face 28 of the one-piece cylinder block 26. However, it should be noted that there is sufficient material between the end surface 42 of the cylinder chamber 38 and the end face 28 of the cylinder block 26 to provide the cylinder block with a rigid construction which is capable of withstanding substantial operating loads without breaking or deforming.

Since the cylinder block 26 is formed as one-piece, there are no joints at the upper ends of the cylinder chambers 38 through which fluid can leak. In addition, the difficulty and expense involved in forming the cylinder block tends to be minimized since the cylinder chamber 38 can be bored into the cylinder block.

A metal cylinder sleeve or liner 52 is telescopically disposed in the cylinder chamber 38. The sleeve 52 has a cylindrical sidewall 54 which is disposed in a coaxial relationship with the cylindrical sidewall 40 of the cylinder chamber 38. The cylindrical sidewall 54 stops short of the end face 42 of the cylinder chamber 38 and has a cylindrical inner surface 56 which cooperates with the end face 42 to define a piston chamber 58 in which a metal piston 60 is disposed.

The generally cylindrical sleeve 52 is connected with the cylinder block 26 by external threads 64 (FIG. 2) which are formed on the lower end portion of the sleeve. The external threads 64 engage internal threads 46 at the open lower end portion 48 of the cylinder chamber 38. The internal threads 46 in the open end portion 48 of the cylinder chamber 38 can be easily formed contemporaneously with boring of the cylinder chamber.

The sleeve 52 has a circular rim 66 which abuts an annular shoulder 68 formed in the open end portion 48 of the cylinder chamber 38. An O-ring seal 70 is provided between the sleeve 52 and sidewall of the cylinder chamber 38 to prevent the leakage of high pressure fluid between the sleeve and the cylinder chamber. It should be noted that the circular rim 66 of the sleeve 52 is disposed in a cylindrical recess 74 (FIG. 2) in the open end portion 48 of the cylinder chamber 38 so that an annular outer end surface 76 of the sleeve 52 is disposed inwardly of the flat side surface 30 of the cylinder block 26.

This construction of the adapter cushion 26 enables a sleeve 52 to be readily inserted into and removed from a cylinder chamber 38. Thus, when the sleeve 52 is to be removed from the cylinder chamber 38, it is merely necessary to engage openings 78 and 80 and an end face of the sleeve 38 with a spanner wrench to loosen the cylinder sleeve. In addition, there is only a single joint, which is sealed by the O-ring 70, between the cylinder sleeve 52 and the cylinder block 26. By the use of only a single joint between the cylinder sleeve 52 and the cylinder block 26 and the one-piece construction of the cylinder block, the leakage of fluid from the cylinder block tends to be minimized.

In accordance with another feature of the present invention, a cylindrical guide bushing 84 (FIG. 2) is telescopically mounted within the lower end portion of the cylinder sleeve 52. Thus, the guide bushing 84 has a cylindrical outer surface 90 which engages a cylindrical inner surface 92 of the cylinder sleeve 52. The guide bushing 84 has a cylindrical inner surface 96 which engages a cylindrical outer surface 100 on a die pin 102.

The die pin 102 is associated with the upper die assembly 18 (see FIG. 1) and, during operation of the press 10, moves axially relative to the guide bushing 84 to engage the piston 60 and move it from the lower end portion of the piston chamber 58 (as shown in FIG. 2) to the upper end portion of the piston chamber against the influence of fluid pressure. Although other fluids could be utilized, nitrogen under pressure is supplied from a suitable tank 106 (FIG. 2) to a longitudinally extending passage 108 formed in the cylinder block 26 through a suitable hose or other conduit 110. The passage 108 extends perpendicular to the coincident central axes of the sleeve 52 and cylinder chamber 38 and is connected with the cylinder chamber 38 through a circular opening 112.

The tubular sidewall 54 of the sleeve 52 has an outside diameter which is less than the inside diameter of the cylindrical wall 40 of the cylinder chamber 38. Therefore, high pressure gas or other fluid can flow from the passage 108 through a cylindrical passage 116 formed between the cylindrical outer surface 114 of the sleeve 52 and the sidewall 40 of the cylinder chamber 38. The nitrogen or other gas under pressure enters the piston chamber 58 through the open inner end of the sleeve 52 and applies pressure against inner end 118 of the piston 60. During operation of the press this fluid pressure opposes movement of the piston 60 under the influence of the die pin 102 to provide a yieldable force against the components of the die assembly 18 in a known manner and as described in U.S. Pat. No. 3,457,765. Although it is preferred to have the cylinder sleeve 52 terminate short of the end wall 42 of the cylinder 38 to provide fluid communication between the piston chamber 58 and the high pressure fluid passage 108, it is contemplated that suitable openings could be provided in the sidewall 54 of the cylinder sleeve or could be provided in the cylinder block 26, if desired.

During operation of the press 10, sliding movement occurs between the die pin 102 and the guide bushing 84. This sliding movement tends to wear the inner side surface 96 of the guide bushing 84. In order to facilitate replacement of the guide bushing 84, a circular snap ring 122 is utilized to releasably hold the guide bushing in the cylinder sleeve 52. The snap ring 122 abuts an annular outer end surface 124 of the guide bushing 84 and is effective to press an annular inner end surface 126 of the bushing against an annular shoulder 128 formed on the inside of the cylinder sleeve 52. Although in a preferred embodiment of the invention the guide bushing 84 is made of hardened steel to minimize wear, it is contemplated that the guide bushing could be made of other materials, for example, a wear resistant and self-lubricating polymeric material could be utilized.

During operation of the press 10, a relatively high fluid pressure is conducted to the chamber 58. In one specific instance, the nitrogen pressure was 1500 psi. In order to prevent leakage of fluid around the piston 60 and to guide movement of the piston in the cylinder sleeve 52, a combination seal and bearing assembly 132 is mounted on the piston 60.

The combination seal and bearing assembly 132 includes an annular bearing ring 134 formed of a suitable polymeric material. The bearing ring 134 is disposed in abutting engagement with the cylindrical side surface 136 of the piston and the inner side surface 56 of the cylinder sleeve 52. A pair of wiper rings 138 distribute lubricant on the inside surface 56 of the cylinder sleeve 52. The wiper rings 138 are mounted axially inwardly of the bearing ring 134 on a retainer 140.

An annular seal ring 142 is disposed in abutting sealing engagement with the inner surface 56 of the cylinder sleeve 52 and with the sidewall of the piston 60. A second bearing ring 144 is disposed inwardly of the seal ring 142. Finally, a second seal and wiper ring 146 is provided adjacent to the outer end portion of the piston 60. Although the illustrated seal and bearing arrangement 132 is preferred, it is contemplated that known other seal and bearing arrangements could be utilized if desired.

To further reduce the overall height of the adapter cushion 16, the piston 60 has an axial length which is substantially equal to its diameter. It should be noted that although the piston 60 has a relatively short axial length, it is long enough to enable the combination seal and bearing assembly 132 to be mounted on the piston to prevent the leakage of fluid from the piston chamber 58 and to guide movement of the piston relative to the cylinder sleeve 52. Of course if the adapter cushion 16 was used in an environment where its overall height did not have to be minimized, a longer piston could be utilized if desired.

Although only a single cylinder 38, cylinder sleeve 52 and piston 60 have been illustrated in FIG. 2, it should be understood that a rectangular array of cylinders 38 and cylinder sleeve 52 is disposed in the cylinder block 26 in the manner illustrated in FIGS. 3 and 4. High pressure gas or fluid passages 108 (FIGS. 2 and 3) are provided through the one-piece cylinder block 26 to conduct nitrogen or other gas under pressure to each of the cylinder chambers 38. The straight passages 108 intersect the cylinder chamber 38 disposed in a line in the one-piece cylinder block 26. Although each passage 108 is shown in FIG. 3 as intersecting only cylinder chambers on one side of the passage, it is contemplated that the passage 108 could, if desired, be formed of a diameter sufficient to enable it to intersect the cylinder chambers on both sides of the passage 108.

When an adapter cushion 16 is designed for use with one particular die assembly, the arrangement and number of cylinder chambers 38 in the adapter cushion corresponds to the arrangement and number of die pins 102 associated with that die assembly. However, it is contemplated that the adapter cushion 16 may be used with die assemblies having different numbers and arrangements of die pins. Due to the difference in the number and arrangement of die pins with different die assemblies, some of the cylinder chambers 38 in the adapter cushion 16 will be active, that is associated with a die pin, while other cylinder chambers will be inactive, that is chambers will not be associated with a die pin.

Figure 5:
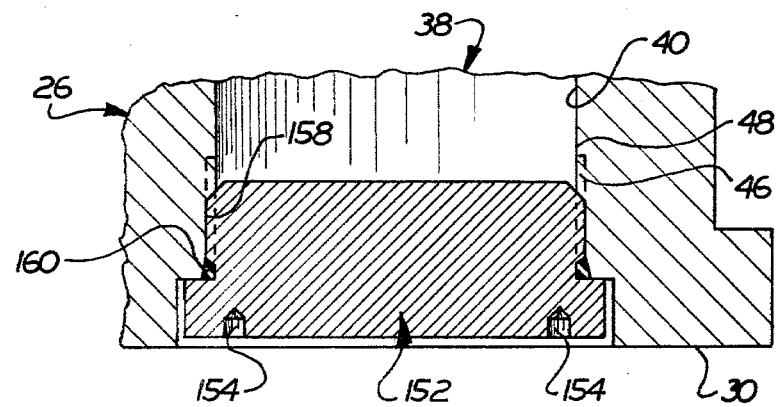
FIG. 5 is a fragmentary sectional view illustrating the manner in which a plug can be mounted in a cylinder chamger in place of the sleeve shown in FIG. 2.

In order to prevent the leakage of high pressure nitrogen or other fluid from the inactive cylinder chambers, plugs or covers 152 (see FIG. 5) are screwed into the open lower end portion 48 of the inactive cylinder chambers 38. The plugs 152 are provided with openings 154 which can be readily engaged by a spanner wrench or other tool to tighten the plugs 152 into place. Thus, the plugs 152 are provided with external threads 158 which engage the internal threads 46 formed at the open lower end portion of the cylinder chamber 38. When the plug 152 has been tightened into place, an O-ring seal 160 prevents the leakage of fluid from the cylinder chamber 38.

It is relatively easy to modify the adapter cushion 16 to accommodate die assemblies 18 having many different arrangements and numbers of die pins. This is because once the upper die assembly 18 has been removed from the adapter cushion 16, the lower end portions of the cylinder sleeves 52 are readily accessible to enable them to be quickly and easily removed from the associated cylinder chambers 38 and replaced with plugs 152. Similarly, plugs 152 can be readily removed and a cylinder sleeve 52 inserted in its place. This enables the arrangement of plugs 152 and cylinder sleeves 52 in the one-piece cylinder block 26 to be varied to accommodate different numbers and arrangements of die pins 102 without disassembling the adapter cushion 16. It should be noted that the spanner wrench openings 78 and 80 in the cylinder sleeves 52 and the spanner wrench openings 154 in the plugs 152 are easily accessible from the major side 30 of the adapter cushion. This results in a decrease in press down time when a change in die assemblies is to be made. In addition, this arrangement tends to minimize the investment which must be made in sleeves 52 and pistons 60.

Figure 6:
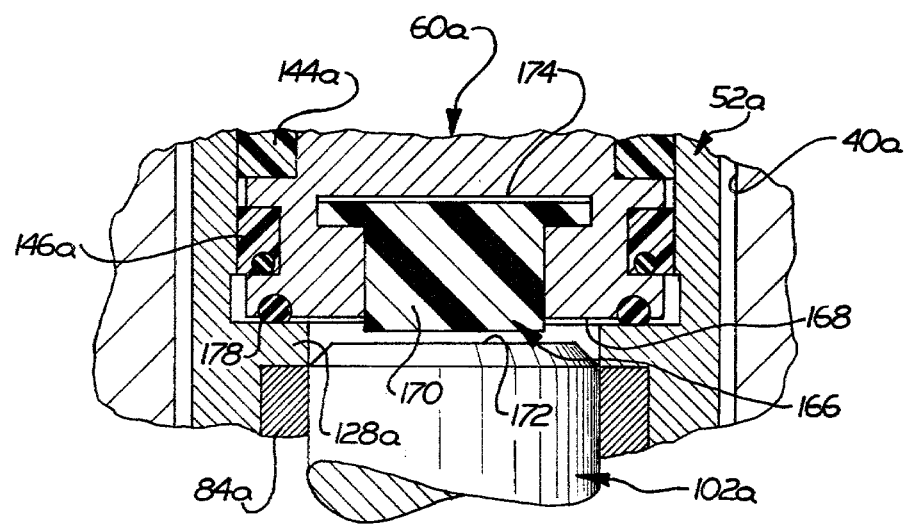
FIG. 6 is a fragmentary sectional view of a piston having a resilient bumper which tends to minimize noise.

During operation of the press 10, the outwardly projecting die pins 102 impact against the outer ends of the piston 60 and force the pistons upwardly against the influence of the fluid pressure in the piston chamber 58. Due to the repetitive impacting of the die pins 102 against the piston during continued operation of the press 10, a substantial amount of noise is generated. Although this noise may not be objectionable in certain environments, it is detrimental to the comfort of the operators of the press and other personnel which may be in the general area. In order to minimize the noise which is generated during operation of the press 10, the pistons 118 could be modified in the manner shown in FIG. 6. Since the embodiment of the invention shown in FIG. 6 is generally similar to the embodiment of the invention shown in FIGS. 1-5, similar numeral will be utilized to designate similar components, the suffix letter "a" being associated with the numerals of FIG. 6 in order to avoid confusion.

In accordance with a feature of this embodiment of the invention, the piston 60a is provided with a resiliently deflectable bumper 166 which projects axially outwardly from a circular end face 168 of the piston. The bumper 166 has a cylindrical body 170 having a diameter which is less than the diameter of the end face 172 of the die pin 102a. The bumper 166 is disposed in a chamber 174 formed in the end portion of the piston 60a. The chamber 174 has a volume which is slightly greater than the volume of the bumper 166. This enables the bumper 166 to be compressed into the chamber 174 by the die pin 102a so that the end surface 172 of the die pin applies a force against the end face 168 of the piston 60a during operation of the press 10.

During operation of the press 10, the die pin 102a engages the bumper 166 and compresses the bumper in the recess 174. During compression of the bumper 166, the piston 60a begins its upward movement. As the die pin 102a continues to move upwardly, the bumper 166 is fully compressed and the die pin engages the end face 168 of the piston 60a to force the piston upward against the influence of the high pressure nitrogen gas in the associated piston chamber.

In order to maintain the bumper 166 in the cavity 174, a circular rim 176 is formed on the body 170 of the bumper. The rim 176 cooperates with the sidewalls of the cavity 174 to hold the bumper 166 in place when the end face 172 of the die pin moves away from the bumper.

During a return stroke of the piston 60a, the end face 168 of the piston impacts against the radially inwardly projecting shoulder 128a of the associated cylinder sleeve at the lower end portion of the piston chamber. In order to further reduce noise associated with operation of the press 10, a circular bumper ring 178 is provided in the end face of the piston 60a. This bumper ring cushions the impact of the piston against the shoulder 128a at the end of the piston chamber.

In view of the foregoing, it is apparent that the present invention relates to a new and improved adapter cushion 16 having a one-piece cylinder block 26 which eliminates the need for flat top and bottom plates and the associated joints between the plates and a cylinder assembly. The use of a one-piece cylinder block 26 substantially reduces the cost of fabricating an adapter cushion 16. This is because it is easier to form cylinders 38 in a one-piece block 26 than it is to form flat top and bottom plates which are used in association with a casting in which cylinder sleeves are mounted. In addition, eliminating the top and bottom plates and forming the cylinder block as one-piece facilitates disassembly of the adapter cushion since there are fewer components which have to be removed.

Another feature of the present invention is the use in the one-piece cylinder block 26 of cylinder sleeves 52 in which guide bushings 84 are releasably mounted. The bushings 84 guide relative movement between the adapter cushion 16 and die pins during operation of a press 10. By releasably mounting the guide bushings 84 in the cylinder sleeves 52, the guide bushings 84 can be readily replaced in the event of wear during extended periods of operation.

The cylinder sleeves 52 are connected with the one-piece cylinder block 26 by threaded connections 46, 64. These threaded connections are readily accessible since they are located adjacent to a major side surface 30 of the one-piece cylinder block 26. The threaded connections 46, 64 enable the cylinder sleeves 52 to be readily removed from the block 26 and plugs 152 inserted in place of cylinder sleeves when the die pin configuration is changed. Since the cylinder sleeves 52 and plugs 152 are readily interchanged, press down time required to make a die change is reduced. In addition, by using plugs 152 to close inactive cylinder block openings for a particular die pin configuration, the investment required in cylinder sleeves 52 and pistons 60 is minimized.

In accordance with still another feature of the present invention, the operating noise associated with an adapter cushion 26 is minimized. This is accomplished by providing resilient bumpers 166, 178 to absorb the impact forces against the pistons. Although the bumpers could be mounted in many different ways, it is preferred to mount a resilient bumper 166 in an opening 174 formed in the piston 60a. This opening 174 is sized so as to enable the bumper 166 to be compressed by the die pin 102a as it moves into engagement with the end portion of the piston. The operating noise associated with the adapter cushion is still further reduced by the provision of a second resilient bumper 178 to minimize noise caused by impacting of the end portion of a piston against the end of a cylinder.

The overall height of an adapter cushion 16 constructed in accordance with the present invention is minimized in two different ways. The elimination of top and bottom plates by the use of a one-piece cylinder block 26 tends to reduce the overall height of the adapter cushion. In addition, the pistons 60 are formed with a relatively short axial extent to further reduce the overall height of the adapter cushion.

Having described specific preferred embodiments of the invention, the following is claimed:

1. An adapter cushion for use in a press or the like with a die assembly having a plurality of projecting die pins, said adapter cushion comprising a cylinder block having a first major side surface adapted to engage the press, a second major side surface extending parallel to said first major side surface and adapted to engage the die assembly, and a plurality of minor side surfaces extending between said major side surfaces, said cylinder block including surface means for defining a plurality of cylinder chambers having parallel central axes and disposed in an array in said cylinder block, each of said cylinder chambers having a cylindrical sidewall with an open end portion connected with said second major side surface and a closed end portion disposed in said cylinder block adjacent to said first major side surface, each of said cylinder chambers having an internal thread convolution disposed adjacent to said open end portion, a plurality of sleeve means for lining some of said cylinder chambers, each of said sleeve means being telescopically disposed in one of said cylinder chambers and having an open end portion with an external thread convolution disposed in engagement with an internal thread convolution in said cylinder block, each of said sleeve means including a cylindrical wall which at least partially defines a piston chamber, said open end portion of said sleeve means including surface means adapted to be engaged by a tool disposed adjacent to said second major side surface of said cylinder block to rotate said sleeve means relative to said cylinder block, a plurality of plug means for blocking some of said cylinder chamber, each of said plug means including external thread means for engaging said internal thread convolution and surface means adapted to be engaged by a tool disposed adjacent to said second major side surface of said cylinder block to rotate said plug means relative to said cylinder block, a plurality of pistons each of which is disposed in a piston chamber in one of said sleeve means, each of said pistons having an end portion which is adapted to be engaged by a die pin, and a plurality of passages connected in communication with a source of fluid under pressure and with at least one of said piston chambers to thereby provide fluid pressure in said piston chambers opposing movement of said pistons under the influence of the die pins during operation of the press.

2. An adapter cushion as set forth in claim 1 further including a plurality of tubular guide bushings each of which is telescopically disposed in one of said sleeves, each of said guide bushings having an inner surface for engaging a die pin during operation of the press.

3. An adapter cushion as set forth in claim 1 wherein each of said pistons has a generally cylindrical configuration with an axial length which is substantially the same as its diameter.

4. An adapter cushion as set forth in claim 3 wherein the end portion of each of said pistons includes first resilient bumper means for engaging one of the die pins to tend to minimize noise upon engagement of the die pin with the piston and second resilient bumper means circumscribing said first resilient bumper means for engaging a stop surface upon movement of the piston to an end of stroke position, said stop surface being fixedly connected with one of said sleeves.

5. An adapter cushion for use in a press or the like with a die assembly having a plurality of projecting die pins, said adapter cushion comprising a one-piece metal cylinder block having a first major side surface adapted to engage the press, a second major side surface extending parallel to said first major side surface and adapted to engage the die assembly, and a plurality of minor side surfaces extending between said major side surfaces, said one-piece cylinder block including surface means for defining a plurality of cylinder chambers having parallel central axes and disposed in an array in said one-piece cylinder block, each of said cylinder chambers having a cylindrical sidewall with an open end portion connected with said second major side surface and a closed end portion disposed in said one-piece cylinder block adjacent to said first major side surface, each of said cylinder chambers having an internal thread convolution disposed adjacent to said open end portion, a plurality of sleeve means for lining said cylinder chambers, each of said sleeve means being telescopically disposed in one of said cylinder chambers and having an external thread convolution disposed in engagement with an internal thread convolution in said one-piece cylinder block, each of said sleeve means including a cylindrical wall which at least partially defines a piston chamber and an end portion disposed adjacent to said second side of said one-piece cylinder block, a plurality of tubular guide bushings each of which is telescopically disposed in the end portion of one of said sleeve means adjacent to said second side of said one-piece cylinder block, a plurality of retainer means for releasably holding said guide bushings in said sleeve means, each of said guide bushings having an inner surface for engaging a die pin during operation of the press, a plurality of pistons each of which is disposed in a piston chamber in one of said sleeve means, each of said pistons having an end portion which is adapted to be engaged by a die pin, each of said pistons having a generally cylindrical configuration with an axial length which is substantially the same as its diameter, a plurality of seal means each of which is mounted on one of said pistons for engaging an inner surface of one of said sleeve means, each of said seal means including a pair of axially spaced apart bearing rings with a seal ring between said bearing rings, and a plurality of passages disposed in said cylinder block and extending in a direction transverse to the central axes of said cylinder chambers, each of said passages being connected in communication with a source of fluid under pressure and with at least one of said piston chambers to thereby provide fluid pressure in said piston chambers opposing movement of said pistons under the influence of the die pins during operation of the press.

6. An adapter cushion as set forth in claim 5 wherein each of said sleeve means has a one-piece construction and has an inner end surface which is disposed adjacent to and spaced apart from the closed end portion of one of said cylinder chambers and an outer end surface which is adjacent to said second major side surface of said cylinder block, each of said guide bushings being disposed within one of said sleeve means.

7. An adapter cushion as set forth in claim 5 wherein the end portion of each of said pistons includes resilient bumper means for cooperating with one of the die pins to tend to minimize noise upon engagement of a die pin with the end portion of the piston.

8. An adapter cushion as set forth in claim 5 wherein each of said sleeve means includes in inwardly projecting shoulder disposed within said sleeve means, said shoulder having a stop surface facing toward said first side of said one-piece cylinder block, each of said pistons has an end portion which is engageable with a stop surface on one of said shoulders to limit movement of the piston toward said second side of said one-piece cylinder block.

9. An adapter cushion as set forth in claim 8 wherein said shoulder in each of said sleeve means has a locating surface facing toward said second side of said one-piece cylinder block, each of said bushings having an end portion which is engageable with a locating surface to locate the bushing in one of said sleeve means.

10. An adapter cushion as set forth in claim 5 wherein each of said seal means further includes a second seal ring which is disposed on one of said pistons at a location between the piston end portion which is adapted to be engaged by a die pin and the bearing ring which is closest to the piston end portion.

11. An adapter cushion as set forth in claim 5 further including a wiper ring disposed between said bearing rings.

12. An adapter cushion for use in a press or the like with a die assembly having a plurality of projecting die pins, said adapter cushion comprising a cylinder block having surface means for defining a plurality of cylinder chambers, a plurality of pistons each of which is disposed in a cylinder chamber, a plurality of stop surfaces connected with said cylinder block, each of said pistons having an end portion which is adapted to be engaged by a die pin, said end portions of each of said pistons including first resilient bumper means for engaging one of the die pins to tend to minimize noise upon engagement of the die pin with the piston, said end portions of each of said pistons further including second resilient bumper means for engaging a stop surface upon movement of a piston to an end of stroke position, and a plurality of passages connected in communication with a source of fluid under pressure and with at least one of said cylinder chambers to thereby provide fluid pressure in said cylinder chambers opposing movement of said pistons under the influence of the die pins during operation of the press.

13. An adapter cushion as set forth in claim 12 wherein said end portion of each of said pistons further includes a recess, each of said first bumper means being disposed in one of said recesses.

14. An adapter cushion for use in a press or the like with a die assembly having a plurality of projecting die pins, said adapter cushion comprising a cylinder block having a first major side surface adapted to engage the press and a second major side surface extending parallel to said first major side surface and adapted to engage the die assembly, said cylinder block including surface means for defining a plurality of cylinder chambers having parallel central axes and disposed in an array in said cylinder block, each of said cylinder chambers having a cylindrical sidewall with an open end portion connected with said second major side surface, each of said cylinder chambers having an internal thread convolution disposed adjacent to said open end portion, a plurality of sleeve means for lining said cylinder chambers, each of said sleeve means being telescopically disposed in one of said cylinder chambers and having an external thread convolution disposed in engagement with an internal thread convolution in said cylinder block, each of said sleeve means including a cylindrical wall which at least partially defines a piston chamber, the number of sleeve means being less than the number of cylinder chambers, said adapter cushion further including a plurality of plug means for blocking some of said cylinder chambers, each of said plug means including an external thread convolution disposed in engagement with an internal thread convolution in said cylinder block, a plurality of tubular guide bushings each of which is telescopically disposed in the open end portion of one of said sleeve means, a plurality of retainer means for releasably holding said guide bushings in said sleeve means, each of said guide bushings having an inner surface for engaging a die pin during operation of the press, a plurality of pistons each of which is disposed in a piston chamber in one of said sleeve means, each of said pistons having an end portion which is adapted to be engaged by a die pin, and a plurality of passages disposed in said cylinder block and connected in communication with a source of fluid under pressure and with at least one of said piston chambers to thereby provide fluid pressure in said piston chamber opposing movement of said pistons under the influence of the die pins during operation of the press.

15. An adapter cushion as set forth in claim 14 wherein each of said sleeve means includes a stop surface which is engaged by an end portion of one of said pistons when the piston is at an end of stroke position, said end portion of each of said pistons including resilient bumper means for one of said stop surfaces to tend to minimize noise upon engagement of the piston with the stop surface.

16. An adapter cushion as set forth in claim 14 wherein each of said pistons has a generally cylindrical configuration with an axial length which is substantially the same as its diameter.

17. An adapter cushion as set forth in claim 14 wherein the end portion of each of said pistons includes first resilient bumper means for engaging one of the die pins to tend to minimize noise upon engagement of the die pin with the piston and second resilient bumper means circumscribing said first resilient bumper means for engaging a stop surface upon movement of the piston to an end of stroke position, said stop surface being fixedly connected with one of said sleeves.

18. An adapter cushion for use in a press or the like with a die assembly having a plurality of projecting die pins, said adapter cushion comprising a one-piece metal cylinder block having a first major side surface adapted to engage the press, a second major side surface extending parallel to said first major side surface and adapted to engage the die assembly, and a plurality of minor side surfaces extending between said major side surfaces, said one-piece cylinder block including surface means for defining a plurality of cylinder chambers having parallel central axes and disposed in an array in said one-piece cylinder block, each of said cylinder chambers having a cylindrical sidewall with an open end portion connected with said second major side surface and a closed end portion disposed in said one-piece cylinder block adjacent to said first major side surface, a plurality of sleeve means for lining said cylinder chambers, each of said sleeve means being telescopically disposed in one of said cylinder chambers, each of said sleeve means including a cylindrical wall which at least partially defines a piston chamber and an end portion disposed adjacent to said second side of said one-piece cylinder block, said end portion of each of said sleeve means including a radially extending flange having a side surface which faces toward and extends radially outwardly from said cylindrical wall and is disposed in abutting engagement with said one-piece cylinder block to locate said cylindrical wall axially relative to said cylinder chamber, a first plurality of retainer means each of which releasably holds one of said sleeve means in said one-piece cylinder block with the radially extending flange disposed in engagement with the one-piece cylinder block, a plurality of tubular guide bushings each of which is telescopically disposed in the end portion of one of said sleeve means, a second plurality of retainer means for releasably holding said guide bushings in said sleeve means, each of said guide bushings having an inner surface for engaging a die pin during operation of the press, a plurality of pistons each of which is disposed in a piston chamber in one of said sleeve means, each of said pistons having an end portion which is adapted to be engaged by a die pin, a plurality of passages disposed in said cylinder block and extending in a direction transverse to the central axes of said cylinder chambers, each of said passages being connected in communication with a source of fluid under pressure and with at least one of said piston chambers to thereby provide fluid pressure in said piston chambers opposing movement of said pistons under the influence of the die pins during operation of the press, a plurality of piston seal means each of which is mounted on one of said pistons to block fluid flow along a path extending between the piston and one of said sleeve means, and a plurality of sleeve seal means each of which is mounted between one of said sleeve means and said one-piece cylinder block to block fluid flow along a path extending between the sleeve means and said one-piece cylinder block.

19. An adapter cushion as set forth in claim 18 wherein each of said sleeve means includes an annular stop surface which projects radially inwardly from cylindrical wall, each of said piston end portions having a surface which engages one of said stop surfaces when the piston is at an end of stroke position.

20. An adapter cushion as set forth in claim 18 wherein said first plurality of retainer means includes an internal thread convolution disposed adjacent to said open end portion of each of said cylinder chambers and an external thread convolution on each of said sleeve means and disposed in engagement with an internal thread convolution in said one-piece cylinder block.

21. An adapter cushion for use in a press or the like with a die assembly having a plurality of projecting die pins, said adapter cushion comprising a metal cylinder block having a first major side surface adapted to engage the press, a second major side surface extending parallel to said first major side surface and adapted to engage the die assembly, and a plurality of minor side surfaces extending between said major side surfaces, said cylinder block including surface means for defining a plurality of cylinder chambers having parallel central axes and disposed in an array in said cylinder block, each of said cylinder chambers having a cylindrical sidewall with an open end portion connected with said second major side surface and a closed end portion disposed in said cylinder block adjacent to said first major side surface, a plurality of sleeve means for lining said cylinder chambers, each of said sleeve means being telescopically disposed in one of said cylinder chambers, each of said sleeve means including a cylindrical wall which at least partially defines a piston chamber and an end portion disposed adjacent to said second side of said cylinder block, said end portions of each of said sleeve means including an inwardly projecting shoulder disposed within said sleeve means, said shoulder having a stop surface facing toward said first side of said cylinder block and a locating surface facing toward said second side of said cylinder block, a plurality of tubular guide bushings each of which is telescopically disposed in the end portion of one of said sleeve means, each of said guide bushings having an end surface which engages the locating surface on one of said shoulders to position the guide bushing axially relative to said sleeve means, a plurality of retainer means for releasably holding said guide bushings in said sleeve means, each of said guide bushings having an inner surface for engagng a die pin during operation of the press, a plurality of pistons each of which is disposed in a piston chamber in one of said sleeve means, each of said pistons having an end portion which is adapted to be engaged by a die pin and having a surface for engaging the stop surface on one of said shoulders to limit movement of the piston toward said second side of said cylinder block, and a plurality of passages disposed in said cylinder block, each of said passages being connected in communication with a source of fluid under pressure and with at least one of said piston chambers to thereby provide fluid pressure in said piston chambers opposing movement of said pistons under the influence of the die pins during operation of the press.

22. An adapter cushion as set forth in claim 21 wherein each of said cylinder chambers has an internal thread convolution disposed adjacent to said open end portion, each of said sleeve means having an external thread convolution disposed in engagement with an internal thread convolution in said cylinder block.

23. An adapter cushion for use in a press or the like with a die assembly having a plurality of projecting die pins, said adapter cushion comprising a cylinder block, said cylinder block including surface means for defining a plurality of cylinder chambers having parallel central axes and disposed in an array in said cylinder block, each of said cylinder chambers having a cylindrical sidewall with an open end portion, each of said cylinder chambers having an internal thread convolution disposed adjacent to said open end portion, a plurality of sleeve means for lining said cylinder chambers, each of said sleeve means being telescopically disposed in one of said cylinder chambers and having an external thread convolution disposed in engagement with an internal thread convolution in said cylinder block, each of said sleeve means including a cylindrical wall which at least partially defines a piston chamber and an end portion disposed adjacent to the open end portion of one of said cylinder chambers, said end portion of each of said sleeve means including a shoulder which projects radially inwardly from said cylindrical wall, said shoulder having a stop surface facing toward said cylindrical wall and a locating surface facing away from said cylindrical wall, a plurality of tubular guide bushings each of which is telescopically disposed in the end portion of one of said sleeve means, each of said guide bushings having an inner end surface disposed in abutting engagement with the locating surface on the shoulder of one of said sleeve means to locate the guide bushing axially in the one of said sleeve means, a plurality of retainer means disposed in and connected with said sleeve means for releasably holding said inner end surfaces guide bushings in engagement with said locating surfaces on said shoulders in said sleeve means, each of said guide bushings having an inner surface for engaging a die pin during operation of the press, a plurality of pistons each of which is disposed in a piston chamber in one of said sleeve means, each of said pistons having an end portion which is adapted to be engaged by a die pin, said end portions of said pistons being engageable with said stop surfaces on said shoulders to limit movement of said pistons relative to said sleeve means, and a plurality of passages disposed in said cylinder block, each of said passages being connected in communication with a source of fluid under pressure and with at least one of said piston chambers to thereby provide fluid pressure in said piston chambers opposing movement of said pistons under the influence of the die pins during operation of the press.

24. An adapter cushion as set forth in claim 23 wherein said cylinder block includes a plurality of surfaces defining recesses which circumscribe the open end portions of said cylinder chambers, said end portion of each of said sleeve means including a radially outwardly extending flange disposed within one of said recesses, said flanges on said sleeve means cooperating with said cylinder block to locate said cylindrical walls of said sleeve means axially relative to said cylinder block.

25. An adapter cushion as set forth in claim 23 wherein said end portion of each of said pistons includes resilient bumper means for engaging said stop surfaces on said shoulders to tend to minimize noise upon engagement of a piston end portion with a stop surface.

26. An adapter cushion as set forth in claim 23 wherein the number of sleeve means is less than the number of cylinder chambers, said adapter cushion further including a plurality of plug means for blocking some of said cylinder chambers, each of said plug means including an external thread convolution disposed in engagement with an internal thread convolution in said cylinder block.

27. An adapter cushion as set forth in claim 23 wherein said end portion of each of said pistons includes first resilient bumper means for engaging one of the die pins to tend to minimize noise upon engagement of the die pin with the piston.

28. An adapter cushion as set forth in claim 27 wherein said end portion of each of said pistons further includes second resilient bumper means circumscribing said first resilient bumper means for engaging a stop surface on one of said shoulders to tend to minimize noise upon engagement of the piston with the stop surfaces.

* * * * *